(12) United States Patent
Maeda

(10) Patent No.: US 6,381,206 B1
(45) Date of Patent: Apr. 30, 2002

(54) OPTICAL RECORDING APPARATUS

(75) Inventor: Takanori Maeda, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/429,615

(22) Filed: Oct. 29, 1999

(30) Foreign Application Priority Data

Oct. 30, 1998 (JP) .......................................... 10-311490

(51) Int. Cl.[7] ................................................. G11B 5/76
(52) U.S. Cl. .................................. 369/59.12; 369/53.19
(58) Field of Search .......................... 369/44.32, 47.15, 369/47.17, 47.19, 47.28, 47.49, 53.12, 53.19, 53.42, 59.11, 59.12, 116, 124.04

(56) References Cited

U.S. PATENT DOCUMENTS 6,125,088 A * 9/2000 Ogasawara ............... 369/44.32
6,128,258 A * 10/2000 Kimura et al. ............ 369/44.32

* cited by examiner

*Primary Examiner*—Paul W. Huber
(74) *Attorney, Agent, or Firm*—Morgan, Lewis & Bockius LLP

(57) ABSTRACT

An optical recording apparatus includes: a tilt detecting device for detecting a circumferential direction component of a tilt of a recording medium with respect to a laser beam light axis; a recording pulse signal generating device for generating a recording pulse signal by coding an information signal to be recorded and outputting the generated recording pulse; a modulating device for receiving the recording pulse from the recording pulse signal generating device, and modulating an intensity of a laser beam based on the received recording pulse signal; a laser beam irradiating device for applying the modulated laser beam onto the recording medium; and a recording pulse signal control device for controlling a sending timing at which the recording pulse signal is sent from the recording pulse signal generating device to the modulating device, based on the circumferential direction component detected by the tilt detecting device.

4 Claims, 14 Drawing Sheets

BEAM SPOT

CIRCUMFERENTAL
DIRECTION
OF DISK

WAVEFRONT
ABERRATION
DISTRIBUTION

BEAM SPOT

TILT AHGLE

CIRCUMFERENTAL DIRECTION OF DISK

PROCEEDING DIRECTION OF LASER LIGHT

WAVEFRONT ABERRATION DISTRIBUTION

RMS VALUE OF WAVEFRONT ABERRATION
- F : 225nm~275nm
- E : 175nm~225nm
- D : 125nm~175nm
- C : 75nm~125nm
- B : 25nm~ 75nm
- A : −25nm~ 25nm
- G : −75nm~−25nm
- H : −125nm~−75nm
- I : −175nm~−125nm
- J : −225nm~−175nm
- K : −275nm~−225nm

OPTICAL RECORDING APPARATUS

BACKGROUND OF THE INVENTION

1. Field of the Invention

The present invention relates to a recording apparatus for recording a video signal, an audio signal and the like onto an optical recording disk, and relates, more particularly to, a technique for reducing an influence of a tilt of a disk in a circumferential direction applied to a recording and reproduction of information, in a recording apparatus for carrying out a recording and reproduction of information by transmitting a laser beam onto a transparent substrate of the disk.

2. Description of the Related Art

A recording and reproduction of information onto and from an optical disk is carried out by irradiating laser beams onto the optical disk. The laser beams irradiated onto the optical disk are collected on the optical disk.

In order to increase the recording density of information recorded on the optical disk, the numerical aperture of an objective lens is made larger and the diameter of a light spot formed on the optical disk is made smaller. With this arrangement, it is possible to record the information on the optical disk as a smaller mark. As a result, it is possible to increase a spatial frequency in the circumferential direction of a recording signal and to narrow a track pitch. This method has been widely known in general as a method of increasing the recording density of information.

However, the increasing the numerical aperture of an objective lens has a problem of making larger an influence of a tilt of the disk applied to a recording and reproduction of information. More specifically, when a tilt is generated on the disk, the quantity of aberration generated at a light spot becomes large, and when the diameter of the light spot becomes larger, the distribution of the light spot does not become symmetrical. As a result, it becomes difficult to accurately carry out a recording and reproducing processing of information.

Regarding a tilt of a disk in a radial direction of the disk, it is possible to correct the tilt by adjusting the angle of a pickup or the disk whenever necessary, so that it is possible to reduce an influence of this tilt. On the other hand, regarding a tilt of the disk in a circumferential direction of the disk, it is difficult to correct this tilt by a mechanical adjustment as the speed of variation of the tilt is fast.

When information is recorded on an optical disk in the status where the disk is tilted in a circumferential direction, there is a case where a mark to be recorded on the disk by an irradiation of laser beams is deviated from a position at which the mark should be originally recorded. Such a deviation in the recording spot appears as a jitter of information at the time of reproducing the information, and this jitter degrades the quality of a reproduced signal. A problem like this also occurs when an optical disk has not a flat surface but has a variation in the thickness of the disk, not only when the disk is tilted.

Further, the quantity of aberration generated by the tilt of the optical disk is proportional to the thickness of a transparent substrate constituting the optical disk. Therefore, it is possible to make smaller the quantity of the aberration by reducing the thickness of the transparent substrate. However, when the thickness of the transparent substrate is made smaller, there arises a problem that the performance of the optical disk is lowered due to a hurt or a stain on the disk surface.

Further, the quantity of aberration may be made smaller by reducing the total thickness of the optical disk. However, when the total thickness of the disk is reduced, there arises a problem that the disk as a whole or the disk substrate is easily distorted.

SUMMARY OF THE INVENTION

It is an object of the present invention to provide an optical recording apparatus capable of correctly recording information onto a recording disk even when there is generated a tilt in the recording disk in a circumferential direction of the disk.

An optical recording apparatus in accordance with the present invention includes: a tilt detecting device for detecting a circumferential direction component of a tilt of a recording medium with respect to a laser beam light axis; a recording pulse signal generating device for generating a recording pulse signal by coding an information signal to be recorded and outputting the generated recording pulse; a modulating device for receiving the recording pulse from the recording pulse signal generating device, and modulating an intensity of a laser beam based on the received recording pulse signal; a laser beam irradiating device for applying the modulated laser beam onto the recording medium; and a recording pulse signal control device for controlling a sending timing at which the recording pulse signal is sent from the recording pulse signal generating device to the modulating device, based on the circumferential direction component detected by the tilt detecting device.

In this optical recording apparatus, the recording pulse signal generating device carries out an encoding of an information signal to be recorded, and generates a recording pulse signal. The modulating device modulates the intensity of a laser beam based on this recording pulse signal. The laser beam irradiating device irradiates the laser beam whose intensity has been modulated, to the recording medium. As a result, the information signal is recorded.

The recording of an information signal onto a recording medium is carried out by first heating the recording medium by a laser beam to change optical characteristics of the material of the recording medium, thereby to form marks onto the recording medium. Thus, the information signal is recorded onto the recording medium. Accordingly, when the irradiated surface of the recording medium has a tilt in the circumferential direction of the disk, the center of the spot light quantity of the laser beam is deviated from a proper position due to a generation of aberration.

In the above aspect of the optical recording apparatus according to the present invention, the deviation of the center of the light quantity of the light spot is overcome in the following manner. When the tilt detecting device has detected a circumferential direction component of a tilt of the optical disk with respect to the laser beam light axis, the recording pulse signal control device controls the sending timing of the recording pulse signal to the modulating device, based on a detection output of the circumferential direction component of the tilt. For example, when the center of the light quantity of the light spot has deviated in a direction to gain time, the recording pulse signal control device delays the sending timing of the recording pulse signal from the reference timing. On the other hand, when the center of the light quantity has deviated in a direction to lose time, the recording pulse signal control device advances the sending timing of the recording pulse signal from the reference timing.

As a result, a temperature gradient on the recording medium changes in a similar manner to that of the case where there is no tilt, so that an edge position of a mark to be recorded becomes at a proper position. Accordingly, it is possible to prevent an occurrence of a jitter at the time of a reproduction and to prevent an increase in the error rate. Further, it is possible to carry out a stable recording and reproduction of an information signal even when a disk having a large deformation quantity is used. Furthermore, it is possible to compensate the disk for a warp, so that it is possible to carry out a recording and reproduction of an information signal onto and from a thin disk.

The aforementioned optical recording apparatus in accordance with the present invention, the circumferential direction component may include a component indicating a tilt angle of a recording surface of the recording medium. Furthermore, when the recording surface at a front side of a laser beam in a relatively proceeding direction of the laser beam is tilted in a direction to leave away from the laser beam irradiating device from a reference horizontal position with the light axis as a center, the recording pulse signal control device may delay the sending timing from a predetermined reference timing as the tilt angle becomes larger. Moreover, when the recording surface at the front side of a laser beam in a relatively proceeding direction of the laser beam is tilted in a direction to come closer to the laser beam irradiating device from a reference horizontal position with the light axis as a center, the recording pulse signal control device may advance the sending timing from a predetermined reference timing as the tilt angle becomes larger.

When the recording surface of a recording medium at the front side of a laser beam in a relatively proceeding direction of the laser beam is tilted in a direction to leave away from the laser beam irradiating device from the reference horizontal position with the light axis as a center, the center of the spot light quantity of the laser beam is positioned at a rear side of the laser beam in a relatively proceeding direction thereof with respect to the recording medium from the center of the light axis, due to the influence of aberration. In this case, the recording pulse signal control device delays the sending timing of the recording pulse signal from a predetermined reference timing as the tilt angle in this direction becomes larger. As a result, the mark is recorded at a proper position. On the other hand, when the recording surface at the front side of a laser beam in a relatively proceeding direction of the laser beam is tilted in a direction to come closer to the laser beam irradiating device from the reference horizontal position with the light axis as a center, the center of the spot light quantity of the laser beam is positioned at a front side of the laser beam in a relatively proceeding direction of the laser beam with respect to the recording medium from the center of the light axis, due to the influence of aberration. In this case, the recording pulse signal control device advances the sending timing of the recording pulse signal from a predetermined reference timing as the tilt angle in this direction becomes larger. As a result, the mark is recorded at a proper position. Thus, it is possible to record the mark at a proper position by canceling a deviation of the center of the spot light quantity of the laser beam due to the aberration.

In the aforementioned the optical recording apparatus in accordance with the present invention, the recording pulse signal control device may include (i) a memory device having a plurality of memory units, and (ii) a data read/write control device for sampling the recording pulse signal generated by the recording pulse signal generating device at a predetermined sampling rate and then writing the sampled recording pulse signal into any of the plurality of memory units in the memory device, and for reading the sampled recording pulse signal from any of the plurality of memory units in the memory device at a predetermined reading rate. Furthermore, the data read/write control device may repeat a writing of the sampled recording pulse signal into any of the plurality of memory units and reading of the sampled recording pulse signal from any of the plurality of memory units, and changes a predetermined time interval provided between an end of the writing and a start of the reading to change the sending timing.

The recording pulse signal generated by the recording pulse generating device is sampled at a predetermined sampling rate by the data read/write control device, and is written into the memory device at each predetermined memory unit. Further, the sampled data of the written recording pulse signal is read for each predetermined memory unit in the memory device at a predetermined reading rate by the data read/write control device.

Then, the data read/write control device provides a predetermined time interval between an end of the writing and a start of the reading in each memory unit, and reads out the data by reducing this time interval from a predetermined reference time interval, thereby to advance the sending timing of the recording pulse signal. The data read/write control device also reads out the data by extending the time interval from the predetermined reference time interval, thereby to delay the sending timing of the recording pulse signal. Thus, the data read/write control device adjusts the sending timing by changing the read timing after the recording pulse signal has been once stored in the memory device. As a result, it is possible to easily carry out the control of the sending timing.

In the aforementioned the optical recording apparatus in accordance with the present invention, the recording pulse signal control device may further includes (i) a conversion table for showing a relationship between a tilt angle and a quantity for changing a sending timing, and (b) a conversion device for converting a value of the tilt angle detected by the tilt detecting device into a quantity of change of the predetermined time interval, based on the conversion table.

When a detection output for showing the degree of a tilt angle has been obtained by the tilt detecting device, the recording pulse signal control device converts the degree of the tilt angle into a changing quantity of the time interval, based on the conversion table. As mentioned above, because the relationship between the value of a detection output of the tilt detecting device and the changing quantity of the time interval has been determined in advance by the conversion table as described above, it is possible to promptly obtain the changing quantity of the time interval, so that it is possible to carry out a prompt control of the sending timing.

The nature, utility, and further feature of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

There will be explained below embodiments of the present invention with reference to the attached drawings.
(First embodiment)

At first, a first embodiment of the present invention will be explained with reference to FIG. 1 to FIG. 12.

Figure 1:
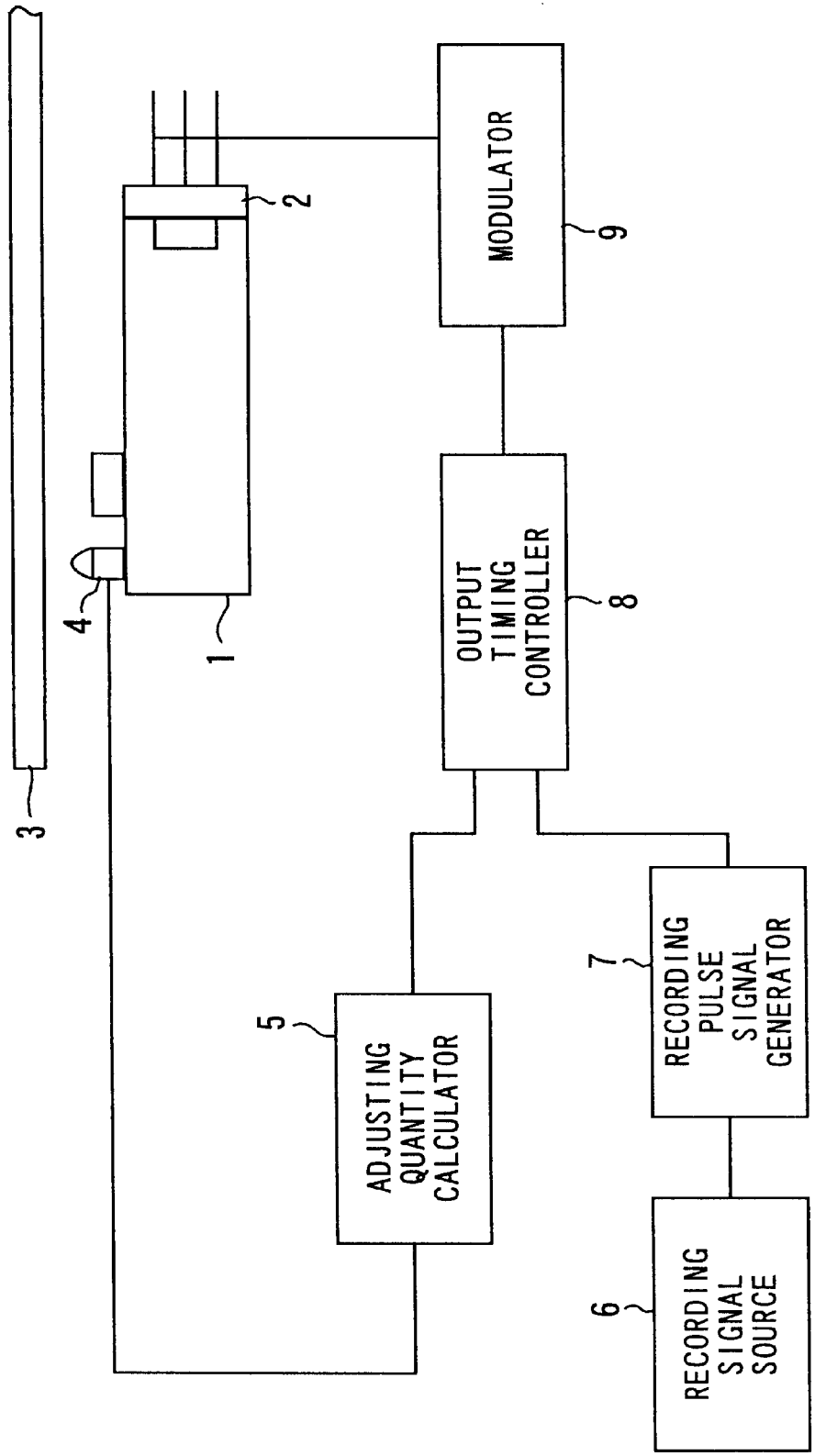
FIG. 1 is a block diagram for showing a structure of a disk recording apparatus according to a first embodiment of the present invention.

FIG. 1 shows a disk recording apparatus as an optical recording apparatus in the embodiment of the present invention. As shown in FIG. 1, the disk recording apparatus of the present embodiment comprises a recording pickup 1, a laser 2 as a light source for generating a laser beam, a tilt detector 4 for detecting a tilt of the disk substrate 3, an adjusting quantity calculator 5 for calculating an output timing adjusting quantity of a recording pulse signal based on an output signal from the tilt detector 4, a recording signal source 6 for outputting a signal to be recorded, a recording pulse signal generator 7 for generating a recording pulse signal by coding a signal outputted from the recording signal source 6, an output timing controller 8 for temporarily storing a recording pulse signal generated by the recording pulse signal generator 7 and for outputting this signal at a predetermined timing, and a modulator 9 for modulating the intensity of a laser beam based on a recording pulse signal outputted from the output timing controller 8. In the optical recording apparatus of the present embodiment, an optical recording disk such as a DVD (a Digital Versatile Disc or a Digital Video Disc) or a CD (a Compact Disc) is used as the recording disk. The recording disk has the disk substrate 3.

Figure 2:
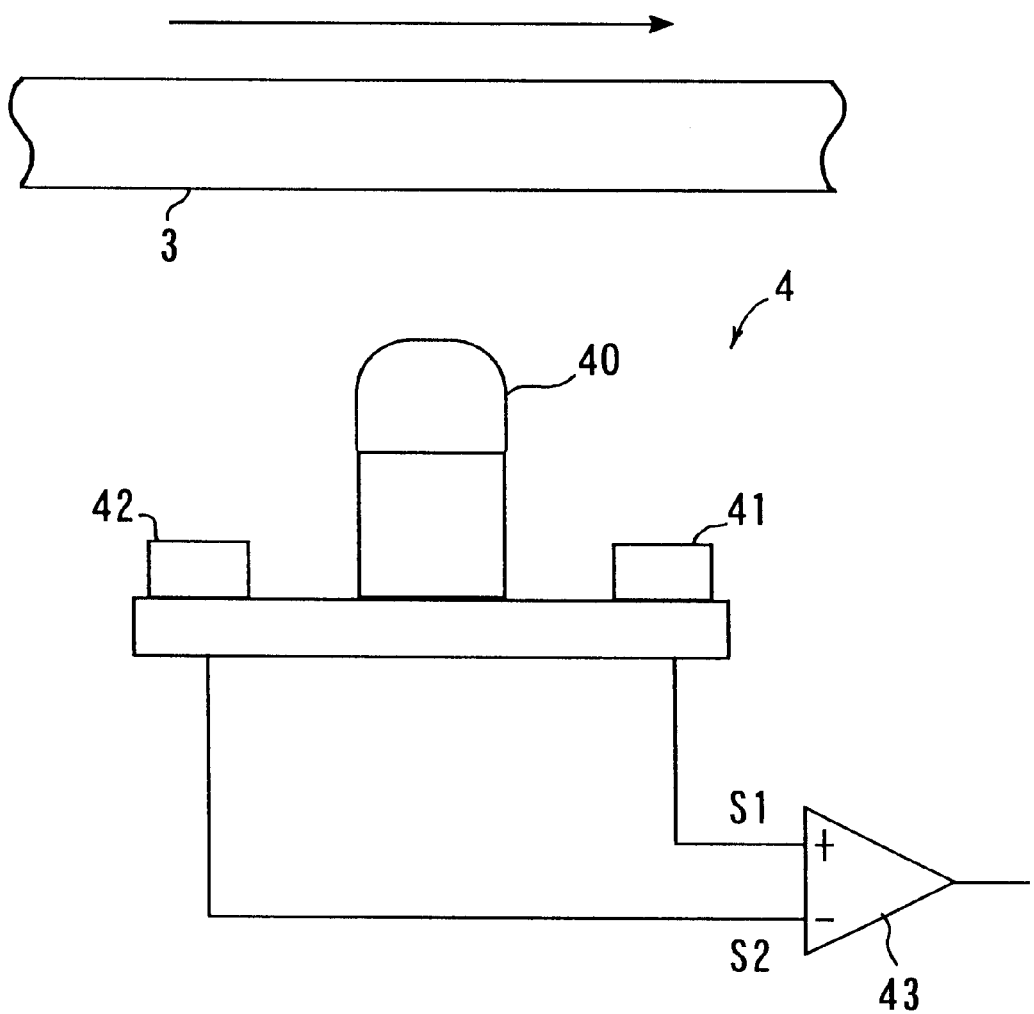
FIG. 2 is a view for showing a structure of a tilt detector in the disk recording apparatus shown in FIG. 1.

The tilt detector 4 has a LED 40 and light detectors 41 and 42 as shown in FIG. 2. The LED 40 is a light source for irradiating a light for detecting a tilt of the disk substrate 3 to the disk substrate 3. The light detectors 41 and 42 are disposed along a circumferential direction of the disk substrate 3 in such a way as to encircle the LED 40. Then, the light detectors 41 and 42 are connected to a differential amplifier 43. Under this structure, a light beam irradiated from the LED 40 and reflected by the surface of the disk substrate 3 is received by the light detectors 41 and 42. Then, the light detectors 41 and 42 output detection signals S1 and S2 respectively by photoelectric conversion corresponding to the quantity of the light received. These detection signals S1 and S2 are input to the differential amplifier 43, and the differential amplifier 43 outputs a difference between the detection signals S1 and S2.

Figure 7A:
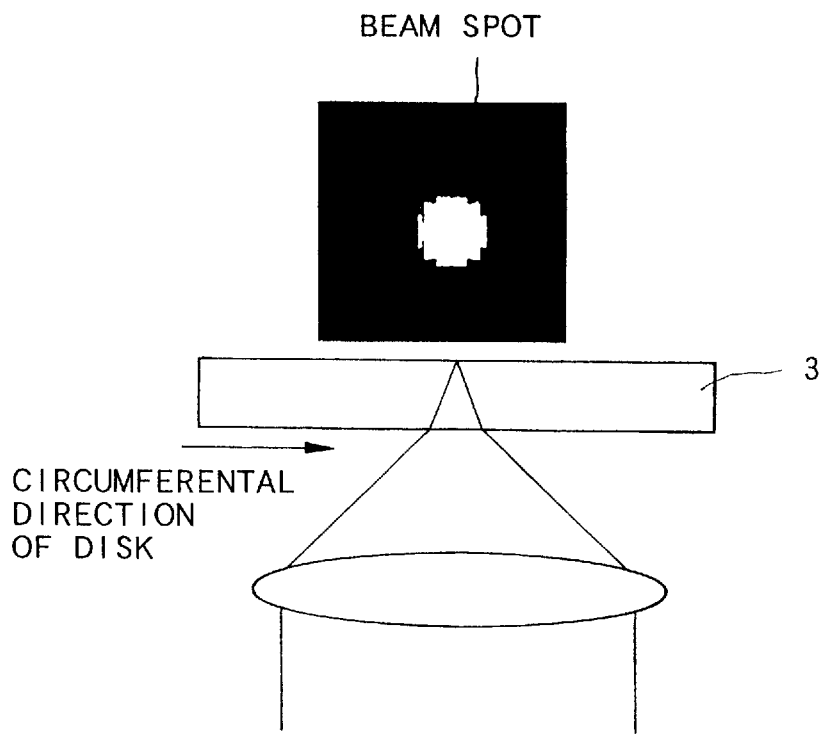
FIG. 7A is a view for showing a relationship between a substrate and a beam in the case where there is no tilt on the substrate, and the spot shape.
Figure 8A:
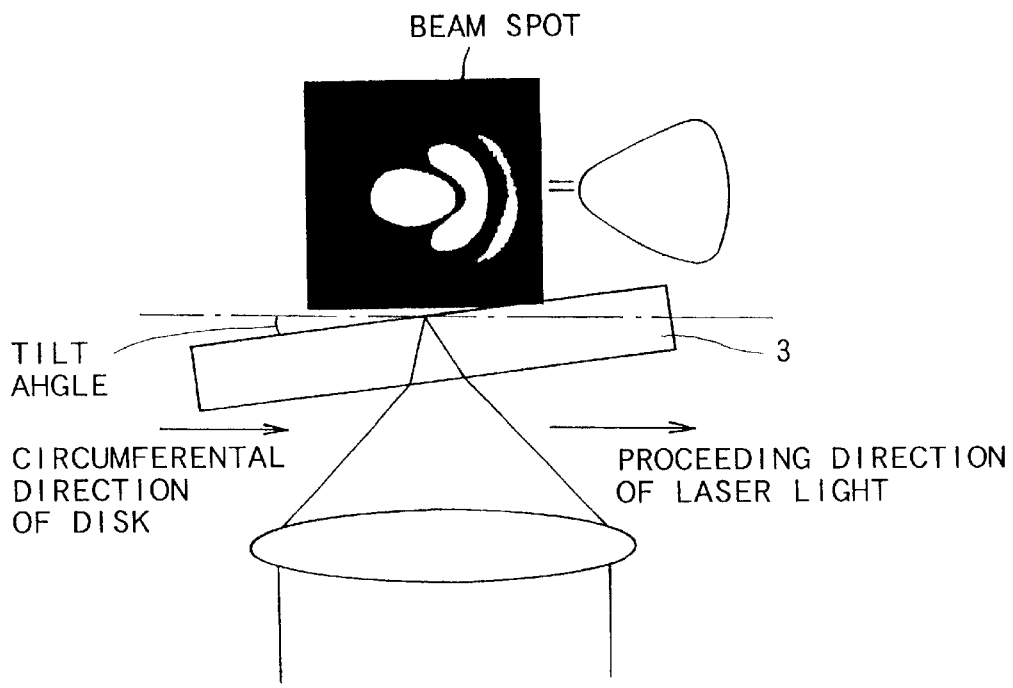
FIG. 8A is a view for showing a relationship between a substrate and a beam in the case where there is a tilt on the substrate, and the spot shape.

The light detectors 41 and 42 are adjusted to produce equal outputs from these light detectors when the disk substrate 3 is not tilted as shown in FIG. 7A, for example. In this case, the output of the differential amplifier 43 is at a zero level. On the other hand, when the disk substrate 3 is tilted as shown in FIG. 8A, the outputs of the light detectors 41 and 42 are unbalanced. As a result, a positive or negative output is obtained from the differential amplifier 43. In FIG. 7A and FIG. 8A, a direction perpendicular to a sheet surface is a radial direction of the disk substrate 3, and FIG. 8A shows a status where the disk substrate 3 is tilted in the circumferential direction of the disk substrate 3.

Figure 3:
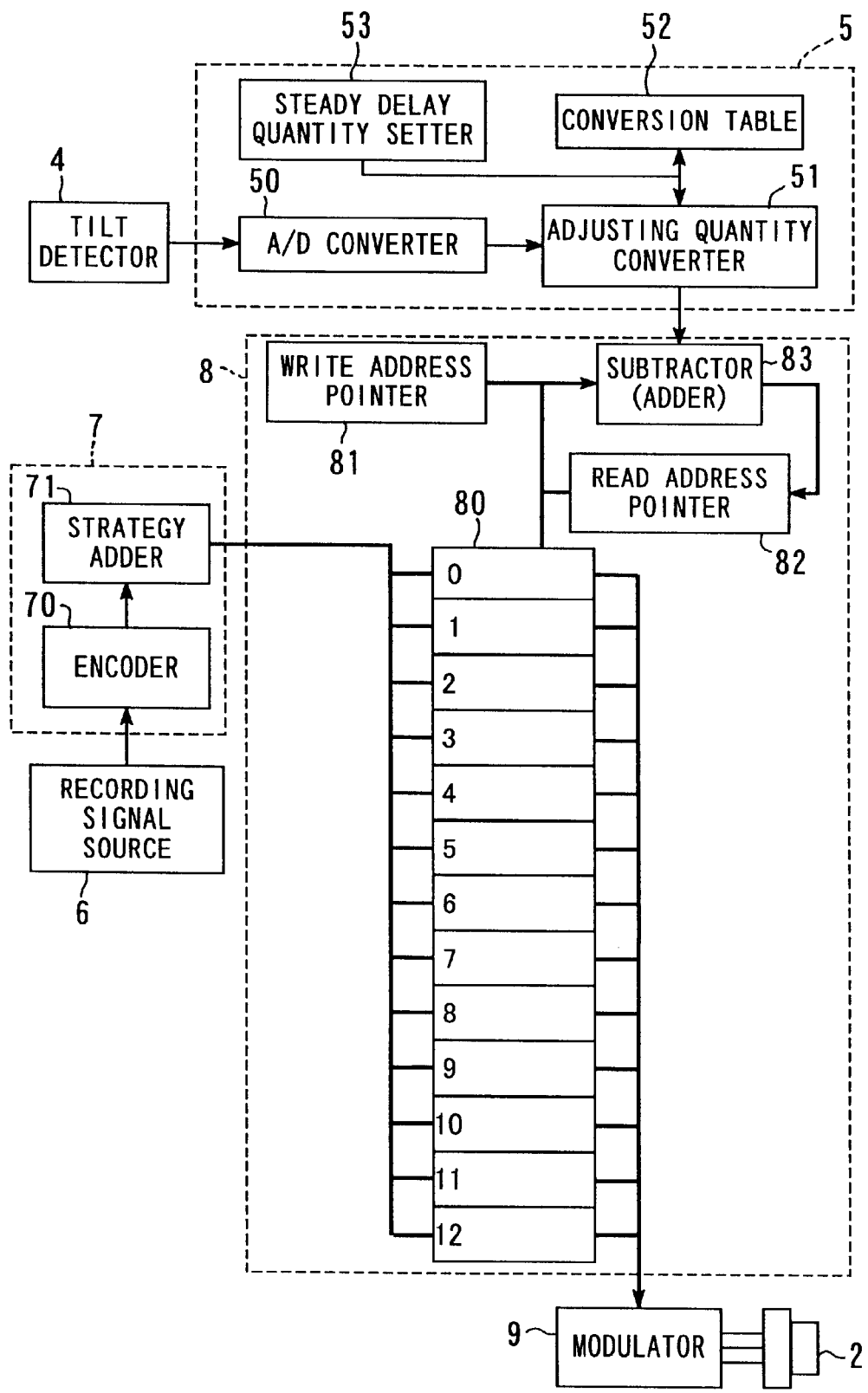
FIG. 3 is a block diagram for showing in further detail the structure of the disk recording apparatus shown in FIG. 1.

FIG. 3 shows a further detailed structure of the tilt detector 4, the adjusting quantity calculator 5, the recording signal source 6, the recording pulse signal generator 7, the output timing controller 8, the modulator 9 and the laser 2 shown in FIG. 1 respectively.

As shown in FIG. 3, the recording pulse signal generator 7 is structured by an encoder 70 and a strategy adder 71. The encoder 70 carries out an 8/16 modulation processing for diving data supplied from the recording signal source 6 into 8-bit units and then converting the divided units into a predetermined 16-bit pattern. A signal output from the recording signal source 6 is converted into a channel bit pulse string. A shortest pulse width of the channel bit pulse string is 3T, and a longest pulse width of the channel bit pulse string is 11T. In this case, "T" represents a unit length (1 channel bit width) corresponding to a bit interval prescribed by a DVD recording format. When this 8/16 conversion processing is carried out, it becomes possible to take longer a minimum interval of an inversion of "1" and "0" in the channel bit pulse string. Therefore, it is possible to take margin in the recording characteristics and to record data onto a disk in high density. Thus, it becomes possible to improve the recording density. The strategy adder 71 converts a channel bit pulse as shown in FIG. 10(A) outputted from the encoder 70 into a recording pulse waveform consisting of a top pulse and a multi-pulse string as shown in FIG. 10(B). This waveform conversion is carried out to mitigate a thermal interference between pre and post pits generated on the disk substrate 3 and a heat accumulation at the rear end of the pits.

The output timing controller 8 has a readable memory 80, a write address pointer 81 for showing a value of a write address in the memory 80, a read address pointer 82 for showing a value of a read address in the memory 80, an adder and subtractor 83 for setting a value to be added to or subtracted from a pointer value of the write address pointer 81, and a sampling section 87, as shown in FIG. 3.

The sampling section 87 is a device for sampling a recording pulse outputted from the recording pulse signal generator 7 for each one bit in a predetermined sampling clock period and for outputting the sampled data to the memory 80.

The memory 80 is a memory of a FIFO (First In First Out) system, and is structured by a plurality of memory units allocated with addresses. The areas separated by ruled lines in FIG. 3 represent individual memory units. The capacity of each memory unit is set in n bits. For example, when the capacity of each memory unit is four bits, a four-bit recording pulse sampled by the sampling section 87 is recorded in each memory unit. Although 14 memory units assigned with addresses 0 to 13 are shown in FIG. 3 to simplify the explanation, the memory 80 is structured by a very large number of memory units in actual practice. For example, when one memory unit has a capacity of one bit, the actual memory 80 has a capacity capable of forming this memory unit by the number of $1 \times 10^6$ units.

The write address pointer 81 is a register for storing a pointer that shows a value of a write address in the memory 80, and this write address pointer 81 increments a pointer value at a constant write time interval. The memory 80 writes sampling data of a recording pulse in the address shown by this pointer value. The write time interval is determined by taking into account a period of a sampling clock, a capacity (number of bits) of a memory unit and a time required for writing sampling data. For example, when the period of a sampling clock is expressed as fs, the capacity of a memory unit is n bits, and the time required for writing sampling data is a negligibly short time, then the write time interval Tw is obtained by the following expression (1).

$$Tw = fs \times n \qquad (1)$$

The read address pointer 82 is a register for storing a pointer that shows a value of a read address in the memory 80, and this read address pointer 82 increments a pointer value at a constant read time interval. The memory 80 reads sampling data from the address shown by this pointer value at a predetermined read interval. A pointer value for starting a reading is set as a pointer value of the write address pointer 81 added by or subtracted by a value set by the adder and subtractor 83. In other words, it is so controlled that the write address and the read address do not coincide with each other. The read time interval is determined by taking into account a period of a sampling clock, a capacity (number of bits) of a memory unit and a time required for reading sampling data. For example, when the period of a sampling clock is expressed as fs, the capacity of a memory unit is n bits, and the time required for reading sampling data is a negligibly short time, then the read time interval Tr is obtained by the following expression (2).

$$Tr = fs \times n \qquad (2)$$

The adder and subtractor 83 adds or subtracts an offset value (adjusting quantity) outputted from the adjusting quantity calculator 5 to or from a pointer value outputted from the write address pointer 81. Then, the value obtained as a result is set as a pointer value of the read address pointer 82. Accordingly, the pointer value of the read address pointer 82 is incremented each time when the pointer value of the write address pointer 81 is incremented. Then, a difference between the mutual pointer values determined by an offset value becomes a delay in the timing of reading data from the memory 80 from the timing of writing data to the memory 80. In other words, this difference becomes a phase difference between a sampling clock and a reading clock.

It is assumed, for example, that the capacity (number of bits) of each memory unit is one bit, the offset value is set to four, and the offset value is subtracted from the pointer value of the write address pointer 81. In this case, as the addresses of the memory are 0 to 13, the data write/read operation to the memory 80 becomes as shown in FIG. 4.

Figure 4:
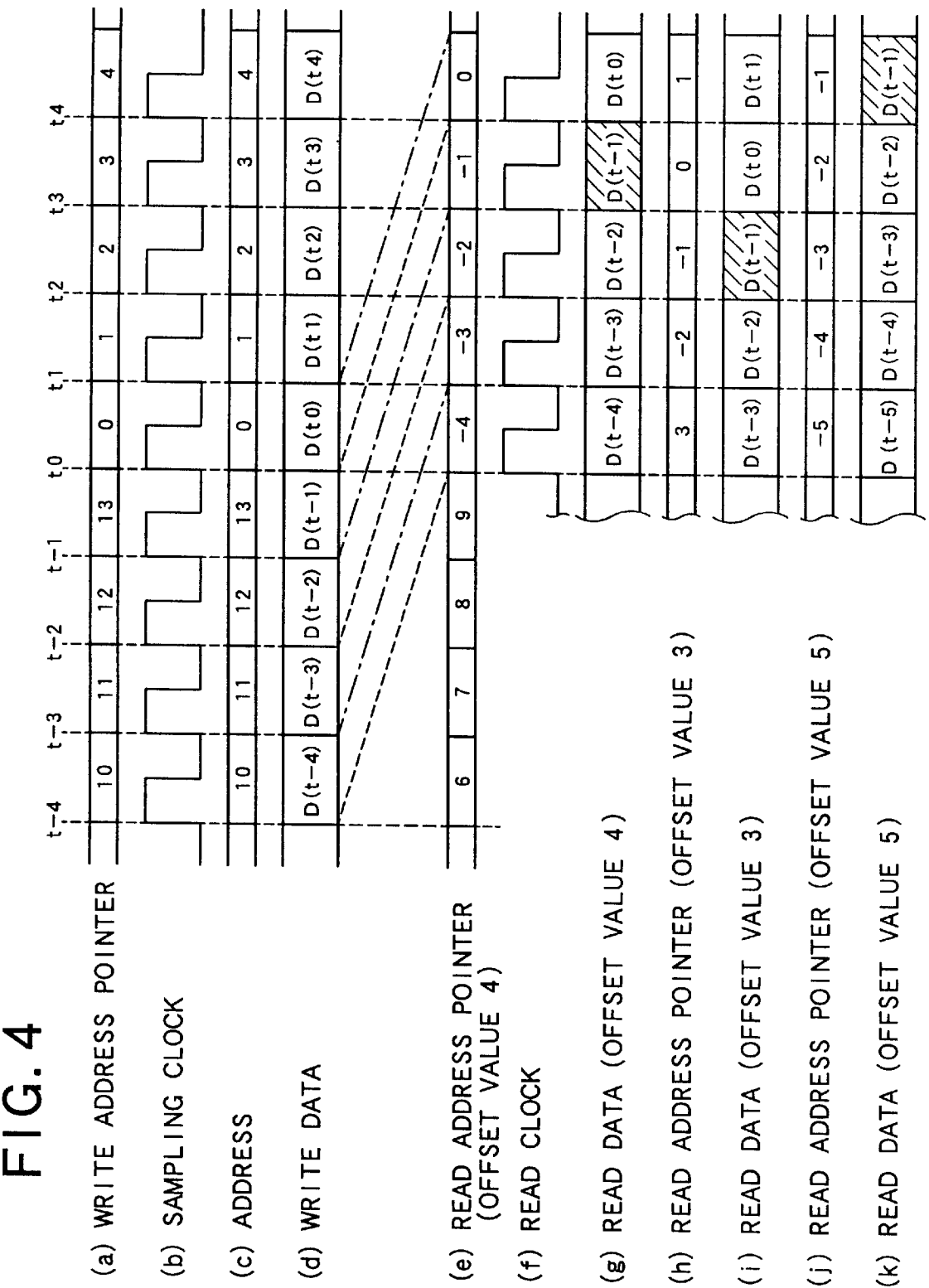
FIG. 4 is a timing chart for explaining the operation of an output timing controller in FIG. 3.

Referring to FIG. 4, at first, when the pointer value of the write address pointer 81 is 0 at time t0 as shown in FIG. 4(a), the address is 0 as shown in FIG. 4(c). It is assumed that sampling data D (t0) is written in this address 0 as shown in FIG. 4(d). Then, 4 is subtracted from this pointer value 0 by the subtractor 83. As a result, the pointer value of the read address pointer 82 becomes −4 as shown in FIG. 4(c). The memory 80 is used as a circular buffer, and the pointer value of the write address pointer 81 proceeds so that the next address of the address 13 becomes 0 as shown in FIG. 4(c). Accordingly, the address corresponding to the pointer value −4 becomes the address four addresses before 0, that is, the address becomes 10. Accordingly, while the data D (t0) is being written into the address 0 at time t0, data D (t−4) from the address 10 is read as shown in FIG. 4(g). Next, the pointer value of the write address pointer 81 becomes 1 at time t1 as shown in FIG. 4(a), and data D (t1) is written into the address 1 as shown in FIG. 4(c) and (d). Then, as shown in FIG. 4(g), data D (t−3) is read from the address 11 corresponding to the pointer value −3 of the read address pointer 82 as shown in FIG. 4(e). Similarly, data D (t2) is written into the address 2 at time t2 as shown in FIG. 4(c) and (d), and data D (t−2) is read from the address 12 as shown in FIG. 4(g). Similarly, data D (t3) is written into the address 3 at time t3 as shown in FIG. 4(c) and (d), and data D (t−1) is read from the address 13 as shown in FIG. 4(g). Then, data D (t4) is written into the address 4 at time t4 as shown in FIG. 4(c) and (d), and the data D (t0) written at the time t0 is read from the address 0 as shown in FIG. 4(g). In other words, the data D (t0) is read at the time t4 that is four clocks after the time t0 when the data D was written.

As explained above, the read timing is delayed from the write timing by a predetermined time. A delay time Tdl in this case is obtained by the following expression (3).

$$Tdl = P \times Tw \qquad (3)$$

where P represents an offset value, and Tw represents a write time interval.

In the example shown in FIG. 4, in order to simplify the explanation, it has been assumed that the capacity (number of bits) of the memory unit is one bit and the write time interval is equal to the period of the sampling clock. However, when the write time interval is set n times the period of the sampling clock, that is, when the capacity of the memory unit is n bit(s), the write time interval can be obtained by the above expression (1). Therefore, the delay time Tdl of the read timing from the write timing is obtained by the following expression (4).

$$Tdl = P \times fs \times n \qquad (4)$$

where fs represents a period of a sampling clock.

Accordingly, as long as the offset value of the adder and subtractor 83 does not change, the delay time is constant, and the read data has a constant phase delay from the write data. In other words, data written by the laser 2 has a constant phase delay from a recording signal outputted from the recording signal source 6.

Further, when the offset value of the adder and subtractor 83 has been changed, the delay time is changed and the recording timing of the data recorded by the laser 2 is also deviated. For example, in the case of the above-described example, when the offset value of the adder and subtractor 83 has been changed to 3, the pointer value of the read address pointer 82 is −1 as shown in FIG. 4(*h*) and the data D (t−1) of the address 13 is read as shown in FIG. 4(*i*), when the pointer value of the write address pointer 81 is 2 at the time t2 as shown in FIG. 4(*a*). On the other hand, when the offset value of the adder and subtractor 83 has been changed to 5, the pointer value of the read address pointer 82 is −1 as shown in FIG. 4(*j*) and the data D (t−1) of the address 13 is read as shown in FIG. 4(*k*), when the pointer value of the write address pointer 81 is 4 at the time t4 as shown in FIG. 4(*a*). As explained above, in the case of a structure for subtracting the offset value from the pointer value of the write address pointer 81, the read timing of the data D (t−1) becomes faster by one clock when the offset value is subtracted by one, and the read timing of the data D (t−1) becomes delayed by one clock when the offset value is increased by one.

Accordingly, when the write time interval is n times the sampling clock period, that is, when the capacity of the memory unit is n bits, the data read timing becomes faster by a portion corresponding to fs×n when the offset value is subtracted by one, and the data read timing becomes later by a portion corresponding to fs×n when the offset value is increased by one.

In the present embodiment, the offset value of the adder and subtractor 83 is changed according to a tilt of the disk 3 in the circumferential direction of the disk.

Referring back to FIG. 3, the adjusting quantity calculator 5 has an A/D converter 50, an adjusting quantity converter 51, a conversion table 52 and a steady delay quantity setter 53.

The conversion table 52 is recorded with adjusting quantities of output timings of a recording pulse according to a tilt angle of the disk substrate 3. These adjusting quantities are obtained in advance by experiments or by simulation. The output timing of a recording pulse means a timing of reading sampling data of a recording pulse recorded in a memory unit of the memory 80, from the memory unit of the memory 80.

Figure 5:
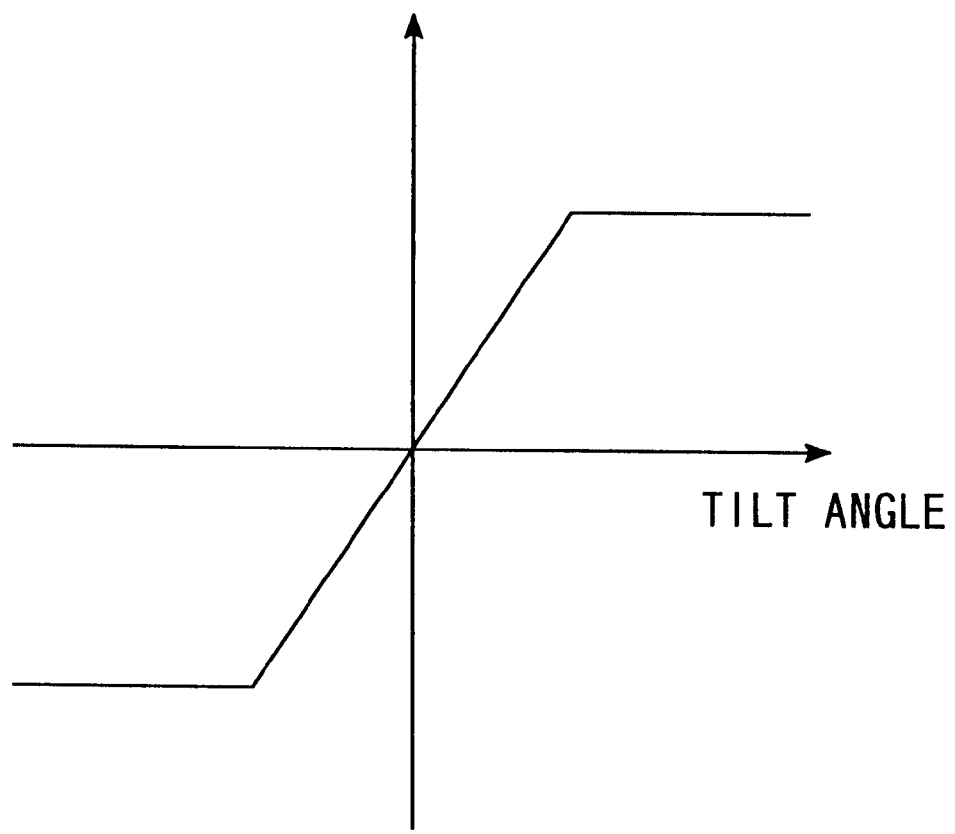
FIG. 5 is a view for showing one example of the conversion table shown in FIG. 3.

FIG. 5 is a graph for showing a relationship between a tilt angle of the disk substrate 3 and an adjusting quantity. According to this graph, when the disk substrate 3 is tilted in such a way that the front side of a laser beam in a relatively proceeding direction of the laser beam is deviated downwards from a reference horizontal position as shown in FIG. 6A, the tilt angle is defined as a positive tilt angle, and when the disk substrate 3 is tilted in such a way that the front side of a laser beam in a relatively proceeding direction of the laser beam is deviated upwards from the reference horizontal position as shown in FIG. 6B, the tilt angle is defined as a negative tilt angle.

Figure 6A:
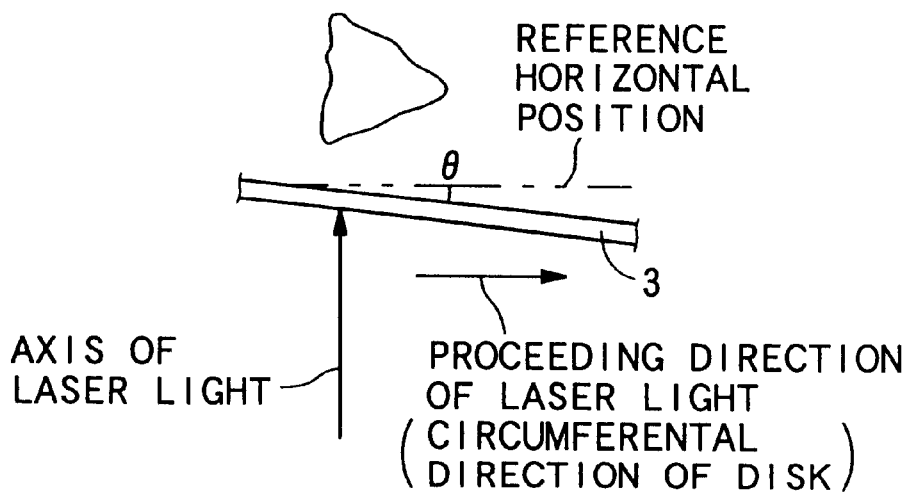
FIG. 6A is a view for showing a status where a substrate is tilted with a tilt angle corresponding to a positive tilt angle in the table shown in FIG. 5.
Figure 6B:
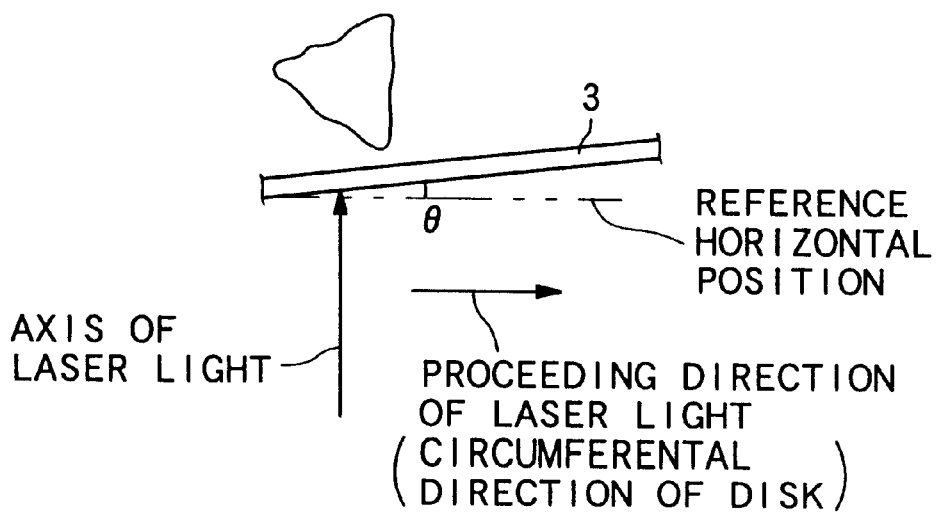
FIG. 6B is a view for showing a status where a substrate is tilted with a tilt angle corresponding to a negative tilt angle in the table shown in FIG. 5.

FIG. 6A and FIG. 6B also show spot shapes SP1 and SP2 when the tilts in both directions occurred.

The conversion table 52 is recorded with time data as an adjusting quantity for showing to what extent the output timing of a recording pulse should be advanced or delayed based on a case where there is no tilt in the disk substrate 3 as a reference. More specifically, time data of a positive value is recorded as an adjusting quantity for advancing the output timing of recording data from the reference, and time data of a negative value is recorded as an adjusting quantity for delaying the output timing of recording data from the reference.

The adjusting quantity converter 51 is a device for generating an offset value for setting a delay time of an output timing of a recording pulse. More specifically, the adjusting quantity converter 51 receives an output value from the tilt detector 4 converted into a digital value by the A/D converter 50. Then, the adjusting quantity converter 51 obtains an adjusting quantity corresponding to this output value from the conversion table 52. Then, the adjusting quantity converter 51 converts the obtained adjusting quantity into a multiple of a write time interval, and adds or subtracts this converted value to or from a steady delay quantity supplied by the steady delay quantity setter 53. The steady delay quantity is an initial value of the offset value. In more detail, the adjusting quantity converter 51 subtracts the converted value from the initial value of the offset value in the case of advancing the output timing of the recording pulse from the case where there is no tilt. On the other hand, the adjusting quantity converter 51 adds the converted value to the initial value of the offset value in the case of delaying the output timing of the recording pulse from the case where there is no tilt. Then, the adjusting quantity converter 51 outputs a final numerical value generated in this way to the adder and subtractor 83 as an offset value.

In explaining in line with the above-explained example, when there is no tilt, the adjusting quantity is 0, and the initial value 4 is set straight as an offset value to the adder and subtractor 83. Further, when there is a positive tilt angle and also when the adjusting quantity coincides with a write time interval, the converted value is 1, and this 1 is subtracted from the initial value 4 of the offset value. As a result, 3 is set to the adder and subtractor 83 as an offset value. Further, when there is a negative tilt angle and also when the adjusting quantity coincides with a write time interval, the converted value is 1, and this 1 is added to the initial value 4 of the offset value. As a result, 5 set to the adder and subtractor 83 as an offset value.

The devices shown in FIG. 3 can be structured by a CPU, except the memory 80, the tilt detector 4, the modulator 9 and the laser 2.

Then, based on the above-described structure, the output timing of the recording pulse (output timing of the laser) can be adjusted according to the tilt of the disk substrate 3. A relationship between a tilt of the disk substrate 3 and an output timing of a recording pulse will be explained in detail below.

Figure 7B:
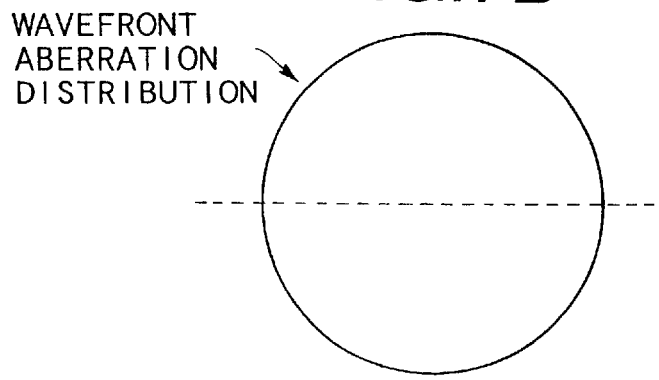
FIG. 7B is a view for showing a wave aberration distribution in the case of FIG. 7A.
Figure 7C:
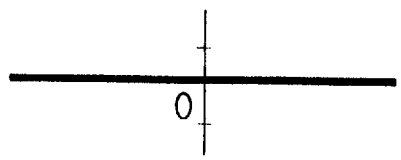
FIG. 7C is a graph for showing a wave aberration distribution shown in FIG. 7B.

When there is no tilt in the disk substrate 3, it is possible to obtain a light spot with a symmetrical shape of a light intensity distribution with respect to the center position of the light axis, as shown in FIG. 7A. In this case, there is no wave aberration like the one as shown in FIG. 7B and FIG. 7C.

Figure 8B:
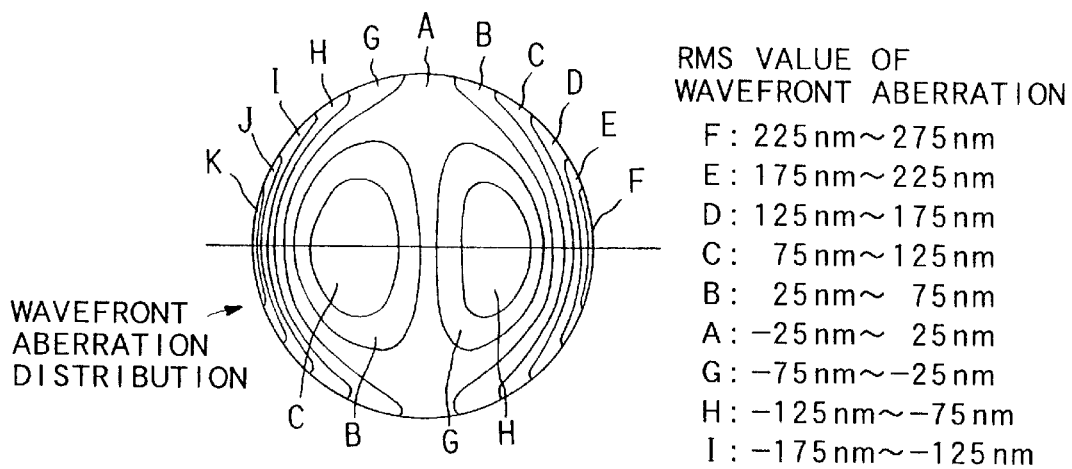
FIG. 8B is a view for showing a wave aberration distribution in the case of FIG. 8A.
Figure 8C:
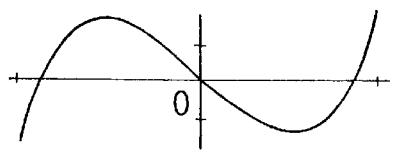
FIG. 8C is a graph for showing a wave aberration distribution shown in FIG. 8B.
Figure 9:
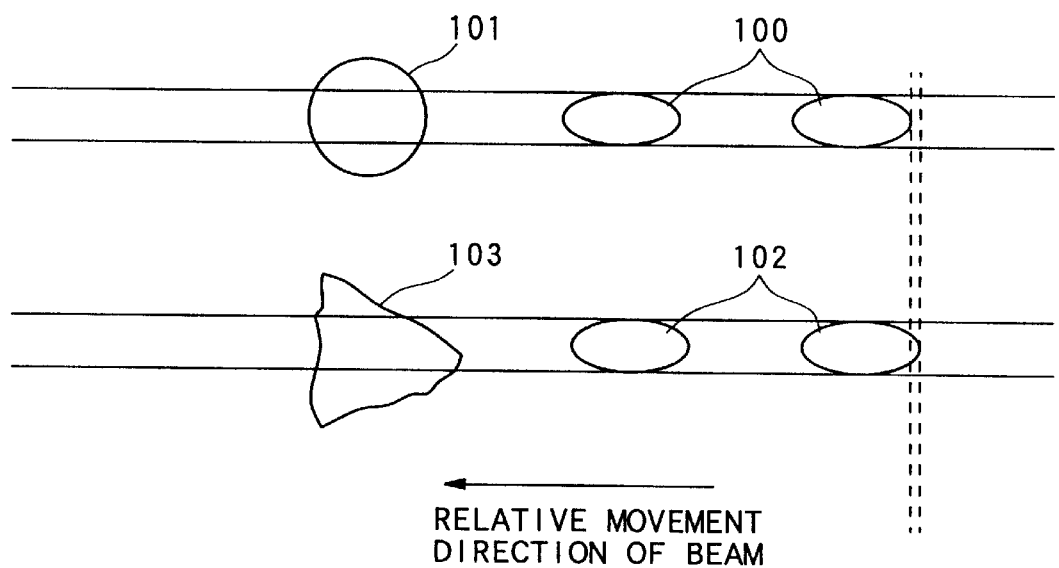
FIG. 9 is a view for showing a comparison between a spot shape and a mark position on a disk of the case where there is no tilt on the substrate and a spot shape and a mark position on a disk of the case where there is a tilt on the substrate.
Figure 10:
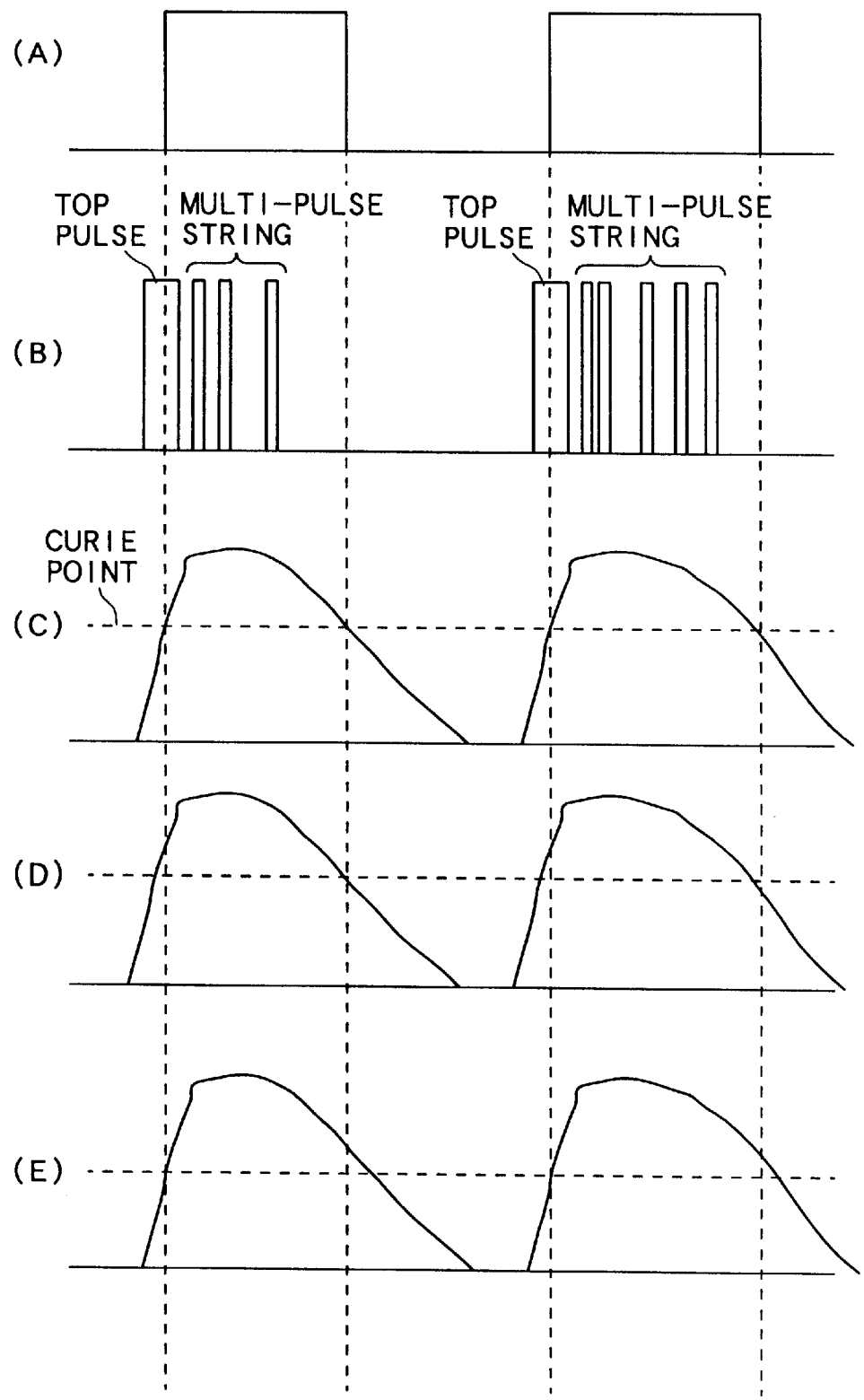
FIG. 10 is a timing chart for showing respectively an 8/16 modulated pulse signal, a recording pulse output from a strategy adder, a temperature gradient on a disk generated by a recording pulse, a temperature gradient on a disk in the case where a recording pulse has been outputted when there has been generated a tilt on the substrate as shown in FIG. 6B, and a temperature gradient on a disk in the case where a recording pulse has been outputted when there has been generated a tilt on the substrate as shown in FIG. 6A.

However, when the disk substrate 3 is tilted as shown in FIG. 8A, a wave aberration is generated along with a coma as shown in FIG. 8B and FIG. 8C. As a result, the shape of a light spot becomes triangular with an asymmetrical distribution of the light intensity distribution with respect to the center position of the light axis as shown in FIG. 8A (symbol SP3 in FIG. 8A). The example shown in FIG. 8A to FIG. 8C is calculated based on the condition that the wave length is 650 nm, the numerical aperture of the objective lens is NA0.6, the thickness of the substrate is 0.6 mm, the disk diffraction index is 1.58, and the tilt angle of the disk substrate 3 is 1.0 degrees in the minus direction (reference FIG. 5 and FIG. 6).

When such a coma has been generated, the center of the light quantity moves to a vertex side of the triangle positioned in a tilted direction of the disk substrate 3, and the heat distribution changes on the disk substrate 3. FIG. 10(C) to FIG. 10(E) show a status of a change in the heat distribution on the disk substrate 3. FIG. 10(A) shows a pulse after an 8/16 modulation outputted from the encoder 70. When there is no aberration, a recording pulse as shown in FIG. 10(B) is outputted so as to give a temperature gradient in which the temperature of a medium exceeds the Curie point at an edge position of the pulse after the 8/16 modulation as shown in FIG. 10(C). As a result, a mark 100 of a shape as shown in FIG. 9(A) is formed. In this case, a spot beam 101 is asymmetrical with respect to the light axis.

On the other hand, when a coma aberration has been generated and a spot beam 103 of a triangular shape as shown in FIG. 9(B) is obtained, the center of the light quantity of the spot beam 103 moves to the rear side of the spot beam 103 in its proceeding direction as compared with the case where there is no aberration. Accordingly, when the laser is moved in a similar manner by the recording pulse shown in FIG. 10(B), the temperature gradient on the disk substrate 3 changes as shown in FIG. 10(D), and a point of time when the temperature exceeds the Curie point advances. As a result, the edge position of a mark 102 is at an advanced position in time as compared with the case where there is no aberration, as shown in FIG. 9(B).

On the other hand, contrary to the case of FIG. 8A, when the disk substrate 3 is tilted downwards at the front side of the beam in its proceeding direction from the center of the light axis and also when the disk substrate 3 is tilted upwards at the rear side of the beam in its proceeding direction from the center of the light axis, the shape of the spot beam becomes such that the center of the light quantity has moved to the front side of the spot beam in its proceeding direction. When the laser is moved in a similar manner by the recording pulse shown in FIG. 10(B), the temperature gradient on the disk substrate 3 changes as shown in FIG. 10(E), and a point of time when the temperature exceeds the Curie point is delayed. As a result, the edge position of a mark is at a delayed position in time as compared with the case where there is no aberration.

The deviations of the mark edge position in time as described above become jitters at the time of reproducing information, and this increases an error rate of a reproduction signal.

In order to solve the above problems, according to the present embodiment, an advanced quantity in time and a delayed quantity in time of a mark edge position in relation to the tilt direction and tilt quantity of the disk substrate 3 have been obtained by experiments or by simulation, and adjusting quantities have been set for making the advanced quantity and the delayed quantity zero, and the conversion table 52 has been prepared.

As a result, when a tilt of the disk substrate 3 that advances a mark edge position has been detected, adjusting quantity of a negative value is obtained from the conversion table 52, and this adjusting quantity of the negative value is subtracted from an initial value of the offset value. Accordingly, the offset value increases, and the phase difference between the read timing and the write timing is made larger as described above, thereby to delay the timing of outputting the recording pulse to the modulator 9. Further, when a tilt of the disk substrate 3 that delays a mark edge position has been detected, adjusting quantity of a positive value is obtained from the conversion table 52, and this adjusting quantity of the positive value is subtracted from an initial value of the offset value. Accordingly, the offset value decreases, and the phase difference between the read timing and the write timing is made smaller as described above, thereby to advance the timing of outputting the recording pulse to the modulator 9.

The overall operation of the apparatus of the present embodiment will be explained below with reference to FIG. 11. It is assumed that the offset value of the adder and subtractor 83 has been set to 4. It is also assumed that the capacity of each memory unit of the memory 80 is one bit. Accordingly, in the example shown in FIG. 11, a one-bit recording pulse is sampled at every one sampling clock, and this sampled pulse is recorded in one memory unit.

Figure 11:
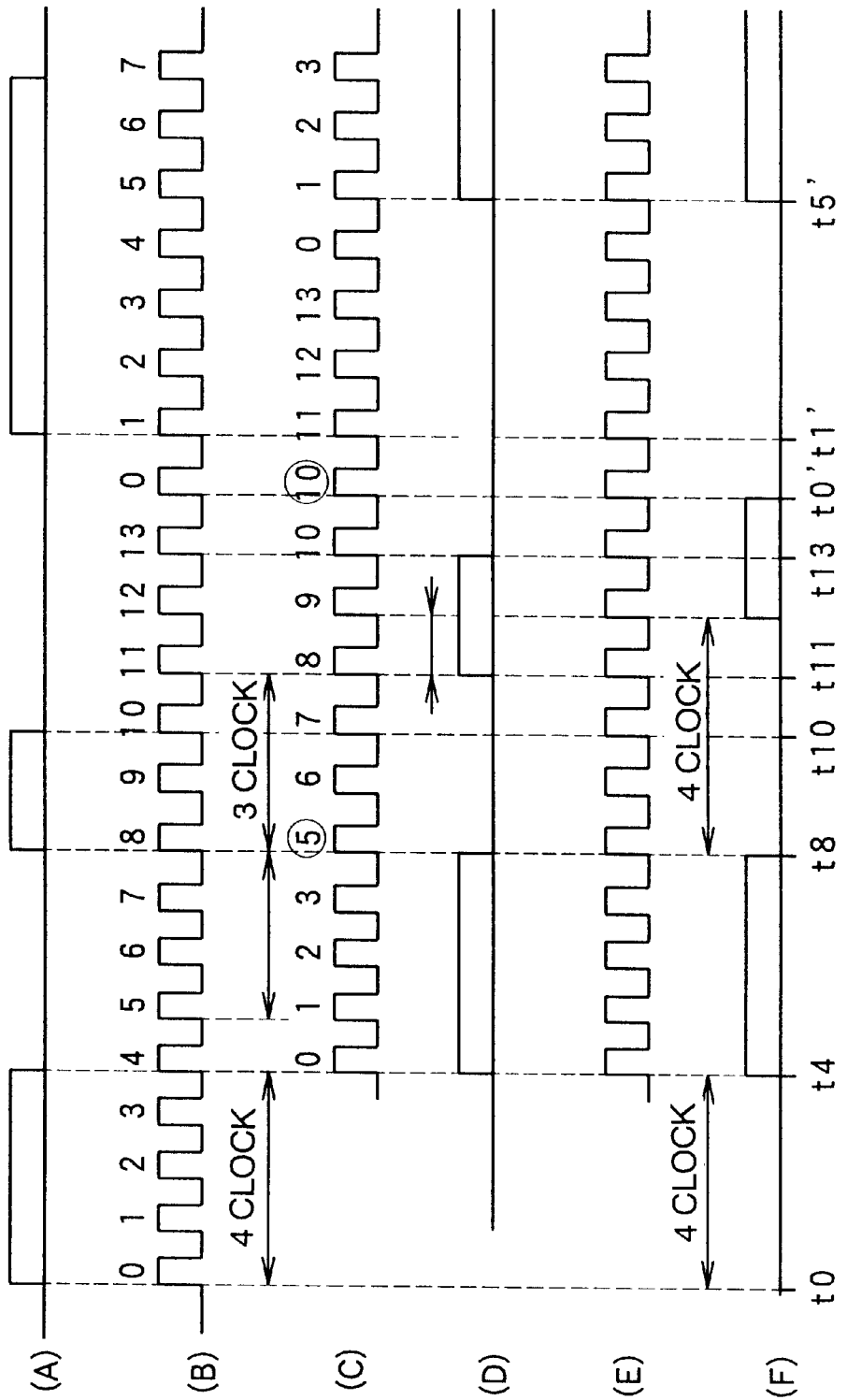
FIG. 11 is a timing chart for showing the operation of an optical recording apparatus when there has been generated a tilt on the substrate as shown in FIG. 6A.

As shown in FIG. 11, during a period from time t0 to t4, strategy-added data shown in FIG. 11(A) is sampled at a sampling interval shown in FIG. 11(B), and the sampled data is written into address 0 to address 3 of the memory 80. Further, during a period from time t4 to t8, there is no strategy-added data shown in FIG. 11(A) and the data becomes zero. This zero data is similarly written into address 4 to address 7. In this case, the read address pointer becomes values 0 to 3, and data of the address 0 to the address 3 are read based on the read clock as shown in FIG. 11(C). Then, the modulator 9 is made to modulate based on the recording pulse that has been read, and laser beams are irradiated from the laser 2 so that information is recorded onto the disk substrate 3.

When a tilt of the disk substrate 3 as shown in FIG. 6A has been detected by the tilt detector 4 while the data in the address 3 is being recorded, the adjusting quantity converter 51 reads an adjusting quantity corresponding to the tilt quantity from the conversion table 52, and determines a new offset value based on the steady delay quantity and the adjusting quantity. In this case, when the tilt quantity corresponds to a delay of a mark edge position by one clock, the offset value is changed to 3 in order to advance the output timing of the recording pulse by one clock.

As a result, during a period from time t8 to time t10, data is written into address 8 to address 10. In this case, as the offset value has been changed to 3, data in address 4 to address 6 are not read but data in address 5 to address 7 are read into the address 8 to the address 10.

Then, during a period from time t11 to time t13, data in address 8 to address 10 are read. Then, the modulator 9 is made to modulate based on the recording pulse that has been read, and laser beams are irradiated from the laser 2 so that information is recorded onto the disk substrate 3.

When the output timing of the recording pulse is looked at, the recording pulse read from the memory 80 and output during the period from the time t4 and the time t8 as shown in FIG. 11(D) has a delay of four clocks from the recording pulse output from the strategy adder 71 during the period from the time t0 to the time t4 as shown in FIG. 11(A). On the other hand, the recording pulse read from the memory 80 and outputted during the period from the time t11 to the time t13 as shown in FIG. 11(D) has a delay of three clocks from the recording pulse output from the strategy adder 71 during the period from the time t8 to the time t10 as shown in FIG. 11(A). In other words, data is output at a timing of one clock in advance as compared with the case where there is no tilt in the disk substrate 3 as shown in FIG. 11(E). However, the center of the light quantity of the spot beam is at the front side of the beam in its proceeding direction due to the tilt of the disk substrate 3 as shown in FIG. 6A, and the mark edge position is recorded with a delay of one clock. Accordingly, as information is recorded with a delay of one clock by the recording pulse output with an advance of one clock as compared with the case where there is no tilt, the mark edge is recorded at a correct position in the same manner as the case where there is no tilt, as a result.

Next, at the time t13, while data is written into address 13, data in the address 10 is read, and laser beams are irradiated from the laser 2 in the output without a recording of data. In this case, when it has been detected that there is no tilt in the disk substrate 3, the offset value is returned to 4 again. Then, at time t0', when data is written into the address 0, data is read not from the address 11 but from the address 10 that is one address before. Then, the modulator 9 is made to modulate based on the recording pulse that has been read, and laser beams are irradiated from the laser 2 so that information is recorded onto the disk substrate 3. In this case, there is no advance or delay in the output timing of the recording pulse, and there is no tilt in the disk substrate 3. Accordingly, a spot beam has a symmetrical shape around the center position of the light axis. Thus, a mark edge is recorded at a correct position without an advance or delay in time.

Figure 12:
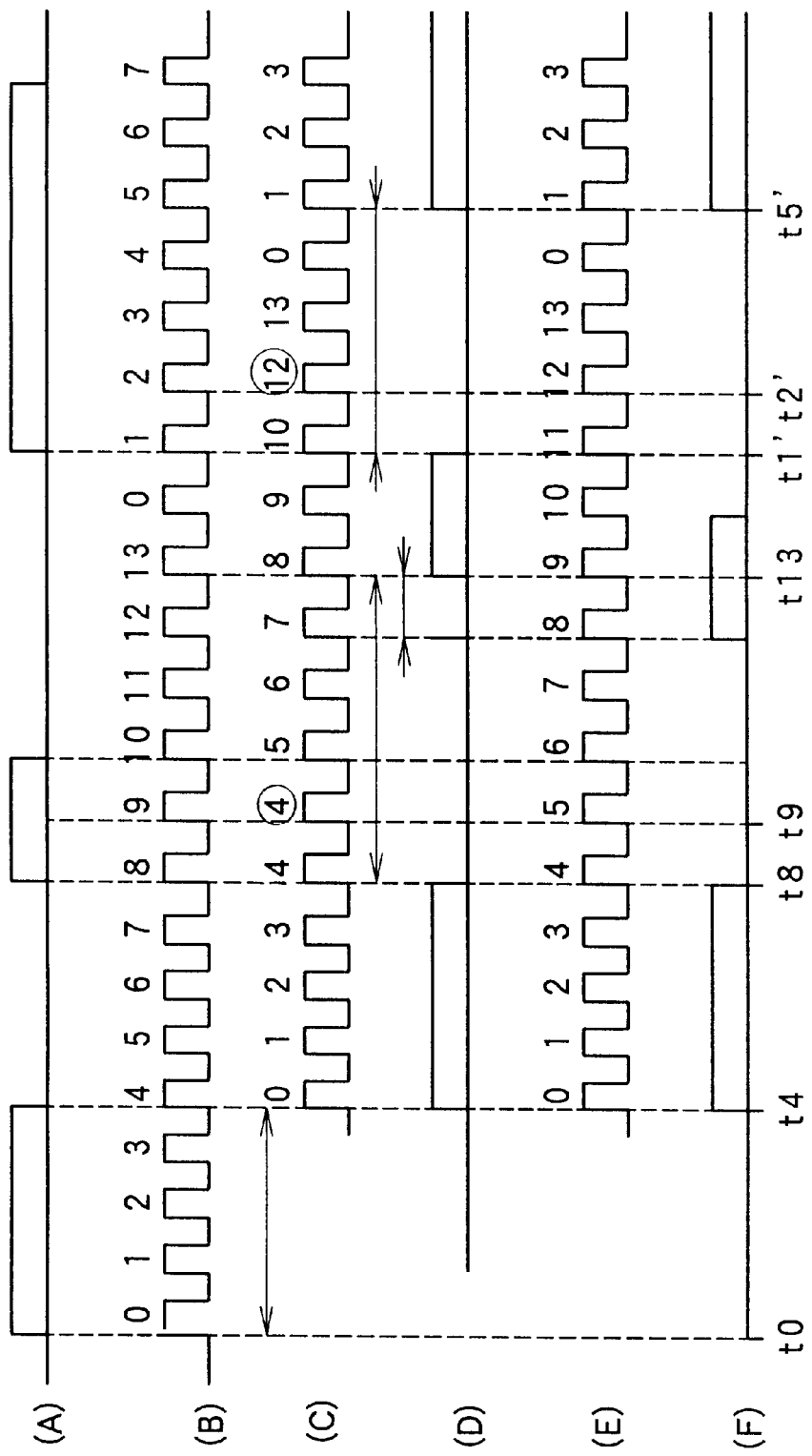
FIG. 12 is a timing chart for showing the operation of an optical recording apparatus when there has been generated a tilt on the substrate as shown in FIG. 6B.

Next, the case where a tilt of the disk substrate 3 as shown in FIG.6(B) will be explained based on FIG. 12. The data writing and reading during the period from the time t0 to the time t8 is carried out in a similar manner to that of FIG. 11. However, when a tilt of the disk substrate 3 as shown in FIG. 6B has been detected by the tilt detector 4 at the time of reading data in the address 4 and outputting laser beams at the time t8, the adjusting quantity converter 51 reads the adjusting quantity corresponding to the tilt quantity from the conversion table 52, and determines a new offset value based on the steady delay quantity and the adjusting quantity. In this case, when the tilt quantity corresponds to an advance of a mark edge position by one clock, the offset value is changed to 5 in order to delay the output timing of the recording pulse by one clock.

As a result, during a period from the time t9 to the time t1', data is written into the address 9 to address 1. In this case, as the offset value has been changed to 5, data in the address 5 to the address 11 are not written but the data in the address 4 to the address 10 are read.

Accordingly, during a period from the time t13 to the time t1', the data in the address 8 to address 10 are also read. Then, the modulator 9 modulates a laser driving current based on the recording pulse that has been read, and laser beams are irradiated from the laser 2 so that information is recorded onto the disk substrate 3.

When the output timing of the recording pulse is looked at, the recording pulse read from the memory 80 and outputted during the period from the time t4 and the time t8 as shown in FIG. 12(D) has a delay of four clocks from the recording pulse outputted from the strategy adder 71 during the period from the time t0 to the time t4 as shown in FIG. 12(A). On the other hand, the recording pulse read from the memory 80 and outputted during the period from the time t13 and the time t1' as shown in FIG. 12(D) has a delay of five clocks from the recording pulse outputted from the strategy adder 71 during the period from the time t8 to the time t10 as shown in FIG. 12(A). In other words, data is outputted at a timing of one clock delayed as compared with the case where there is no tilt in the disk substrate 3 as shown in FIG. 12(E). However, the center of the light quantity of the spot beam is at the rear side of the beam in its proceeding direction due to the tilt of the disk substrate 3 as shown in FIG. 6B, and the mark edge position is recorded with an advance of one clock. Accordingly, as information is recorded with an advance of one clock by the recording pulse output with a delay of one clock as compared with the case where there is no tilt, the mark edge is recorded at a correct position in the same manner as the case where there is no tilt, as a result.

Next, at the time t1', while data is written into the address 1, the data in the address 10 is read, and laser beams are irradiated from the laser 2 in the output without a recording of data. In this case, when it has been detected that there is no tilt in the disk substrate 3, the offset value is returned to 4 again. Then, at the time t2, when data is written into the address 2, data is read not from the address 11 but from the address 12 that is one address after. Thereafter, data is read at similar time intervals, and data is written into the address 5 and data is read from the address 1 at time 5'. The modulator 9 is made to modulate based on the recording pulse that has been read, and laser beams are irradiated from the laser 2 so that information is recorded onto the disk substrate 3. In this case, there is no advance or delay in the output timing of the recording pulse, and there is no tilt in the disk substrate 3. Accordingly, a spot beam has a symmetrical shape around the center position of the light axis. Thus, a mark edge is recorded at a correct position without an advance or delay in time.

As explained above, according to the present embodiment, the output timing of the recording pulse is adjusted according to a tilt direction and a tilt quantity of the disk substrate 3, thereby to compensate a mark edge position for a tilt to carry out a recording at a correct position. Therefore, it becomes possible to carry out a stable recording and reproduction of a signal even when a disk with a large deformation quantity is used. Thus, it is possible to improve the recording and reproduction performance. Further, when a thin disk is used, a warp increases in this disk in general. However, it is also possible to compensate a mark edge position for a warp as described above. Therefore, it becomes possible to use a thin disk. (Second embodiment)

Next, a second embodiment of the present invention will be explained with reference to FIG. 13A through FIG. 13D.

In the present embodiment, the strategy adder 71 has a function of changing a duty or a crest value of a recording pulse according to an absolute value of a tilt quantity of the disk substrate 3. Based on the control of the recording pulse waveform by the strategy adder 71, the above-described mark edge position is compensated.

Figure 13A:
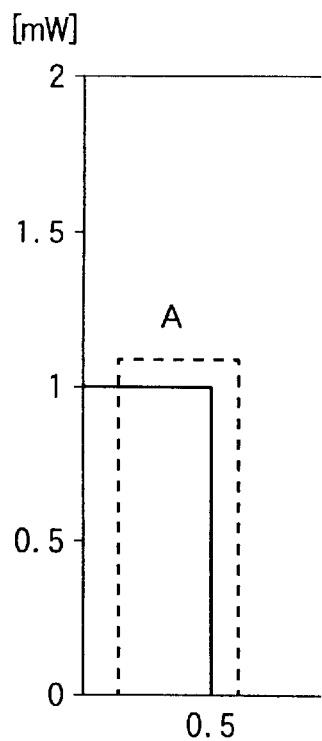
FIG. 13A to FIG. 13D are views for showing an example of a recording pulse outputted from the strategy adder according to a second embodiment of the present invention.

For example, as shown in FIG. 13A, rectangular recording pulses of different levels are outputted from the strategy adder 71. In this case, the temperature of the material of the panel surface of the disk substrate 3 is controlled by delaying the pulse and by changing the height of the pulse (amplitude) so as to compensate the panel surface power density for the loss of the power density that is generated by an expansion of a panel surface irradiation area due to the tilt of the disk substrate 3. When it is possible to absorb this change in the power density as the characteristics of the material, it is of course possible to compensate the power density by only delaying the pulse.

Figure 13B:
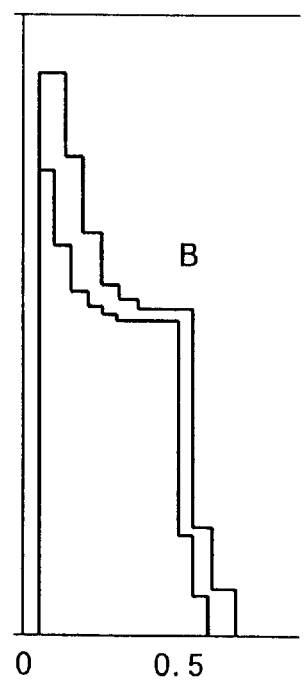

Further, as shown in FIG. 13B, the recording pulse of which level is gradually decreasing is outputted from the strategy adder 71. It is also possible to control the mark edge position by delaying the pulse along with the change in the level of the recording pulse. The level of the recording pulse is decreased by making the shape of the spot on the panel symmetrical with the center of the light axis in a similar manner to the case where there is no tilt in the spot shape when there has been generated a tilt on the disk substrate 3.

Figure 13C:
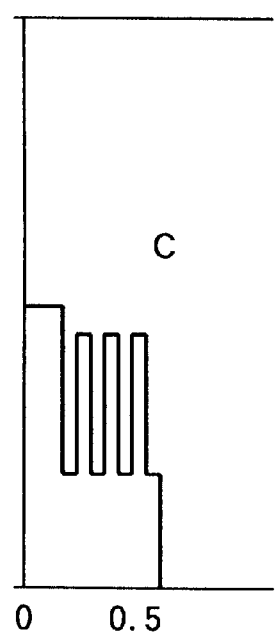

Further, as shown in FIG. 13C, there may be so arranged that a recording pulse of three-value control with a level change in three stages is outputted from the strategy adder 71. In this case, the duty of the recording pulse is changed as well as the recording pulse is delayed, to control the temperature of the material.

Figure 13D:
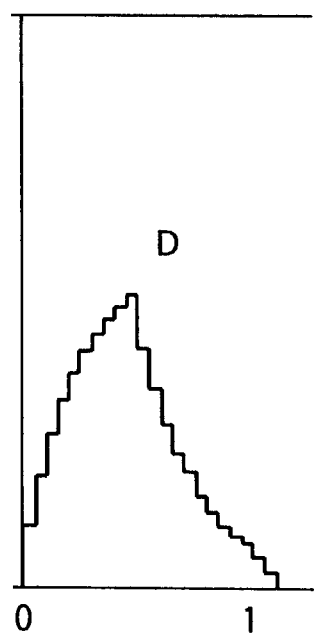

Further, as shown in FIG. 13D, there may be so arranged that a recording pulse with a gradually increasing level and thereafter a gradually decreasing level is outputted from the strategy adder 71. In this case, the mark edge position may be controlled by delaying the pulse in a similar manner to the case of FIG. 13B. Further, at the same time, it is also possible to change the method of decreasing the recording pulse in a similar manner to the case where there is no tilt in the mark shape when there has been generated a tilt on the disk substrate 3.

In the above-described embodiments, a tilt sensor installed externally is used as a method of detecting a tilt quantity. However, the present invention is not limited to this method, and it is also possible to use various kinds of methods that can detect a tilt on the disk substrate, such as, for example, a method of detecting a tilt by hunting a change in the servo signal due to the tilt quantity, a method of detecting a tilt quantity from a reproduction signal of a signal pattern capable of detecting a tilt recorded on a disk in advance, etc.

Further, an explanation has been made of the above-described embodiments by using an optical disk. However, the above-described circuit structure is not limited so long as an optical medium is used. It is also possible to change the circuit structure according to a system of a recorder, a reproducer or the like.

Further, an explanation has been made of the above-described embodiments by using means for delaying a pulse based on FIFO. However, the present invention is not limited to this method. It is also possible to achieve the invention in various forms when pulse patterns are changed at the actual record starting time or record ending timing of the recording pulse corresponding to the output of a detecting device that practically controls a timing exceeding the Curie temperature by selecting a pulse pattern or increasing the power of the recording pulse according to the tilt quantity based on a plurality of pulse patterns prepared in advance.

Further, an explanation has been made of the above-described embodiments by taking an example of a recording onto an optical magnetic recording medium. However, the recording medium is not limited to this, and it is also possible to have a similar structure by using various kinds of media that can achieve an optical recording such as a phase-change recording medium, an organic dye, etc.

Furthermore, in the present invention, it is possible to use in combination a device in the optical system, such as, for example, means for tilting an objective lens to match the tilt of the substrate. In this case, it is possible to employ a structure for delaying a pulse corresponding to a tilt quantity of a practical disk, such as, for example, a residual error quantity in the case of tilting the objective lens to a time axis direction, or according to the reproduction characteristics of a pre-recording signal using this optical system.

The invention may be embodied in other specific forms without departing from the spirit or essential characteristics thereof. The embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-311490 filed on Oct. 30, 1998 including the specification, claims, drawings and summary is incorporated herein by reference in its entirety.

What is claimed is:

1. An optical recording apparatus comprising:
    a tilt detecting device for detecting a circumferential direction component of a tilt of a recording medium with respect to a laser beam light axis;
    a recording pulse signal generating device for generating a recording pulse signal by coding an information signal to be recorded and outputting the generated recording pulse;
    a modulating device for receiving the recording pulse from the recording pulse signal generating device, and modulating an intensity of a laser beam based on the received recording pulse signal;
    a laser beam irradiating device for applying the modulated laser beam onto the recording medium; and
    a recording pulse signal control device for controlling a sending timing at which the recording pulse signal is sent from the recording pulse signal generating device to the modulating device, based on the circumferential direction component detected by the tilt detecting device.

2. The optical recording apparatus according to claim 1, wherein: the circumferential direction component includes a component indicating a tilt angle of a recording surface of the recording medium;
    when the recording surface at a front side of a laser beam in a relatively proceeding direction of the laser beam is tilted in a direction to leave away from the laser beam irradiating device from a reference horizontal position with the light axis as a center, the recording pulse signal control device delays the sending timing from a predetermined reference timing as the tilt angle becomes larger; and
    when the recording surface at the front side of a laser beam in a relatively proceeding direction of the laser beam is tilted in a direction to come closer to the laser beam irradiating device from a reference horizontal position with the light axis as a center, the recording pulse signal control device advances the sending timing from a predetermined reference timing as the tilt angle becomes larger.

3. The optical recording apparatus according to claim 2, wherein:
    the recording pulse signal control device comprises (i) a memory device having a plurality of memory units, and (ii) data read/write control device for sampling the recording pulse signal generated by the recording pulse signal generating device at a predetermined sampling rate and then writing the sampled recording pulse signal into any of the plurality of memory units in the memory device, and for reading the sampled recording pulse signal from any of the plurality of memory units in the memory device at a predetermined reading rate; and the data read/write control device repeats a writing of the sampled recording pulse signal into any of the plurality of memory units and reading of the sampled recording pulse signal from any of the plurality of memory units, and changes a predetermined time interval provided between an end of the writing and a start of the reading to change the sending timing.

4. The optical recording apparatus according to claim 3, wherein the recording pulse signal control device further comprises (i) a conversion table for showing a relationship between a tilt angle and a quantity for changing a sending timing, and (ii) a conversion device for converting a value of the tilt angle detected by the tilt detecting device into a quantity of change of the predetermined time interval, based on the conversion table.

* * * * *